United States Patent

[11] 3,633,880

| [72] | Inventor | Larry J. Newmark |
| | | Guiderland, N.Y. |
| [21] | Appl. No. | 1,424 |
| [22] | Filed | Jan. 8, 1970 |
| [45] | Patented | Jan. 11, 1972 |
| [73] | Assignee | General Electric Company |

[54] EXTRUSION DEVICE
11 Claims, 1 Drawing Fig.

[52] U.S. Cl............................................. 259/191,
425/203, 425/208
[51] Int. Cl................................................. B29f 3/03
[50] Field of Search............................................ 18/12 SN,
12 SS, 12 SM, 12 SJ, 12 SP, DIG. 62

[56] References Cited
UNITED STATES PATENTS

| 3,263,276 | 8/1966 | Maier | 18/12 SN X |
| 3,352,952 | 11/1967 | Marr | 18/12 SN X |
| 3,431,599 | 3/1969 | Foggelberg | 18/12 SN |
| 2,767,430 | 10/1956 | Lorenian | 18/12 SE |

*Primary Examiner*—Robert D. Baldwin
*Assistant Examiner*—Norman E. Lehrer
*Attorneys*—Morgan, Finnegan, Durham & Pine, William F. Mufatti, Frank L. Neuhauser, Oscar B. Waddell and Joseph B. Forman ABSTRACT: A venting section in an extrusion device for venting volatile elements from an extrudate, such as a plastic material, which venting section comprises a plurality of venting segments shaped to alternately compress and decompress said extrudate so as to free from the bulk of the plastic material said volatile elements which can then be carried away by a vacuum system through suitable vent openings formed in the barrel enclosing said venting section.

PATENTED JAN 11 1972
3,633,880
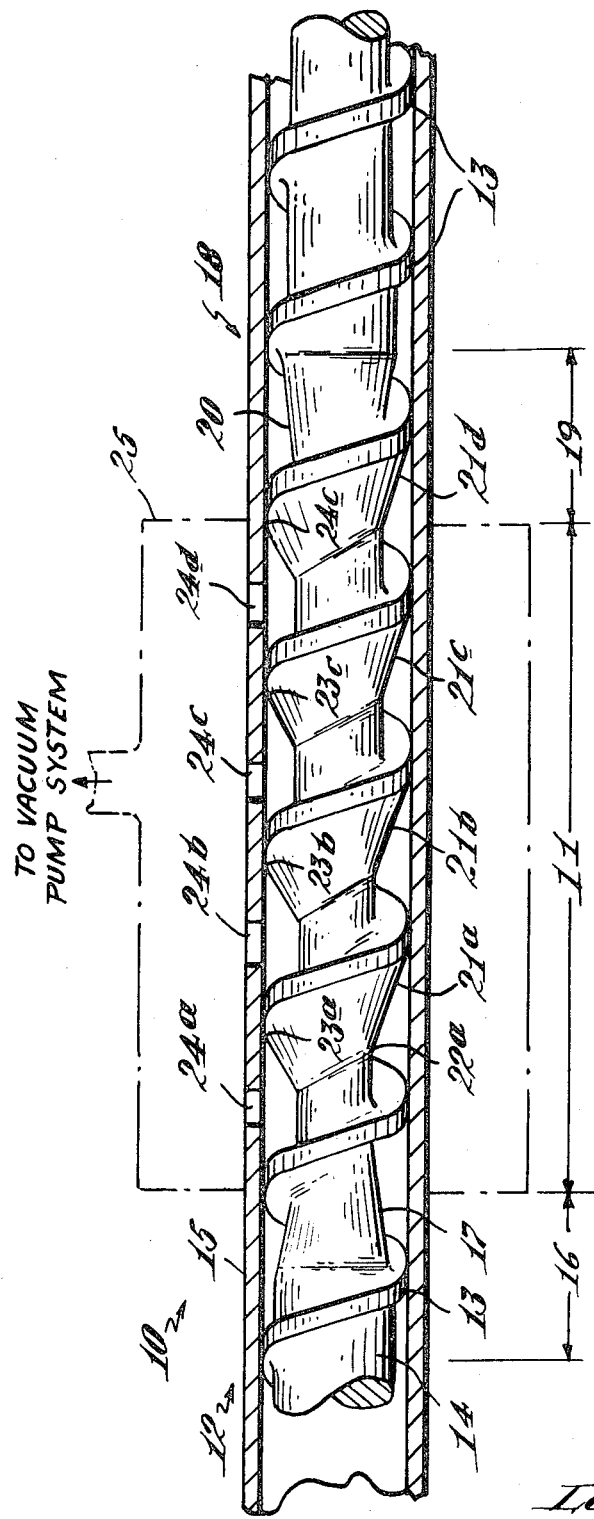
Inventor
Larry J. Newmark
by Roberts, Cushman & Grover
Att'ys

EXTRUSION DEVICE

This invention relates generally to extrusion devices and, more particularly, to extrusion devices for use with plastic materials, such devices having a unique extruder screw vent section which provides efficient venting without thermal degradation or charring of the plastic material.

In presently used extruders, particularly in single screw machines using a vented section, for example, such vent section must have relatively deep cuts in order to suitably expose the molten plastic to the vacuum vent. However, the use of relatively deep cut vent sections tends to enhance the thermal degradation of the plastic material and produces a charring of the resin in many instances.

Prior art devices attempt to avoid such deleterious effects by reducing the flight depth in the vent section so that such effects are less noticable. In some cases, the cut is partially reduced by placing a fillet immediately behind the trailing edge of each flight throughout the vent section. However, a sufficient reduction in depth to reduce charring can also considerably reduce the venting efficiency and the use of a fillet has not been found adequate to provide a good compromise between venting efficiency and thermal degradation problems.

This invention provides for an efficient venting without such harmful effects by incorporating a plurality of "compression-decompression" segments in the venting section wherein the plastic material flows alternatively through deep cut portions where venting takes place and intervening compression portions having extremely shallow cut flight elements, such alternating compression and decompression segments being arranged adjacent one another in a series configuration throughout the venting section between input and output transition sections which feed and carry away the extrudate to and from the vent section.

The invention can be understood more easily with reference to the accompanying drawing wherein the single figure depicts a venting section of a single screw extrusion machine which incorporates the novel elements of the invention.

In the FIGURE, a vent section II of an extruder 10 is fed at one end 12 with an extrudate, such as a molten polymer resin material, carried thereto by a plurality of flights 13 of extruder screw 14 mounted within an extruder cylinder barrel 15 in a manner well known to those in the art. The extrudate is carried through an input transition section 16 in which the screw root diameter is gradually decreased to produce a tapered surface 17.

The other end 18 of vent section 11 carries the polymer material which has been appropriately vented to the remaining portion of the extruder screw through an output transition section 19 having a gradually increasing screw root diameter which provides a tapered surface 20. Flights 13 of screw 14 at such output end of vent section 11 are somewhat deeper than the corresponding flights of the screw at the input end 12, as is usually conventional in present day extrusion machines.

The vent section 11 comprises a plurality of alternating compression and decompression segments which include tapered flights 21a, 21b, 21c, and 21d in each case the tapers extending from minimum points such as at point 22a, at the screw root to maximum points, such as point 23a, adjacent the inner surface of barrel 15, with appropriate clearance therebetween. The outside diameter of the screw shaft is substantially constant throughout the vent section.

Thus, the extrudate is alternately compressed and decompressed throughout the venting process. For example, extrudate entering from tapered transition portion 16 into the first segment of vent section 11 gives off volatile elements via vent opening 24a and becomes compressed at point 23a after having flowed through a relatively deep flighted section in the portion immediately following tapered transition portion 16. The extrudate which is thereby compressed is accordingly smeared across the entrance to the next segment. As the extrudate flows from the exit point 23a of flight 21a into the deeper cut portion of the next segment, it is decompressed and, accordingly, gives off volatile elements which are appropriately vented through vent opening 24b. The vent section 11 is appropriately enclosed in a vacuum system, shown diagrammatically only by dashed line block 25, which system includes vent openings 24 and an appropriate vacuum pump (not shown) for evacuating the enclosure. The structure of such an evacuated venting section is well known to those skilled in the art and need not be shown in further detail here.

Following the decompression operation at the exit of flight 21a, the extrudate is again appropriately compressed as it is moved toward point 23b of flight 21b at which point maximum compression is again achieved and the extrudate again is smeared across the entrance to the next vent segment. The extrudate flows from the exit of flight 21b where it is again decompressed to give off further volatile elements which are also appropriately vented via vent opening 24c as discussed above.

This operation is repeated in a successive number of compression and decompression operations through the remaining flights of vent section 11 and ultimately the extrudate which has been so vented is carried away from vent section 11 to the remainder of the extruder screw configuration via tapered output transition portion 19. Although a plurality of vent openings are shown in the embodiment discussed above, a single opening, extending over one or more vent segments, may be used instead.

The amount of compression which can be used to produce effective results must be limited so as to prevent any flow of extrudate through the vent openings. Thus, the compression level can be determined empirically by suitably shaping the vent segments so that no vent flow can occur during operation of the device.

Throughout the travel of the extrudate through vent section 11 the velocity of the extrudate is maintained approximately constant and no sites exist where degradation or charring can occur. It has been found that a vent section fabricated in accordance with the inventive structure described above produces efficient venting but avoids the thermal degradation and charring problems which have been found in prior art structures.

I claim:

1. In an extrusion device which includes an extruder screw enclosed in a cylindrical barrel, means for venting volatile elements from an extrudate, said means comprising
   a first transition section at one end of said venting means, the root of said extruder screw therein being gradually tapered to a reduced diameter in the direction of travel of said extrudate;
   a second transition section at the other end of said venting means, the root of said extruder screw therein being gradually tapered to an increased diameter in the direction of travel of said extrudate;
   a plurality of venting segments between said transition sections, each said segment including a tapered flight of increased diameter in the direction of travel to compress the extrudate passing therethrough and a deep cut in the direction of travel to decompress said extrudate as it leaves each said segment and enters the next said segment adjacent thereto, whereby volatile elements in said extrudate are given off when transition from the compressed to the decompressed state occurs;
   at least one vent opening in the barrel of said extrusion device adjacent said venting segments; and
   means enclosing said venting segments and said openings for carrying away said vented volatile elements.

2. In an extrusion device in accordance with claim 1 wherein said enclosing means is a vacuum system.

3. In an extrusion device in accordance with claim 1 wherein the taper of the flight and the depth of the cut in each said segment limit the amount of compression sufficiently to prevent said extrudate from flowing through said vent openings.

4. In an extrusion device in accordance with claim 1 wherein the outside diameter of said extruder screw in each venting segment is substantially the same.

5. In an extrusion device in accordance with claim 1 wherein the root diameter provides said deep cut portion in each said venting segment.

6. In an extrusion device in accordance with claim 1 wherein vent opening is formed in the barrel of said extrusion device adjacent each said venting segment.

7. An extrusion device comprising an extruder screw and a cylindrical barrel enclosing said screw, said device including
  a first transition section, terminating downstream in a venting section, the root of the extruder screw in the first transition section being gradually tapered to a reduced diameter in the downstream direction;
  a venting section terminating downstream in a second transition section, said venting section comprising a plurality of segments, said screw in each segment in the downstream direction including a gradually tapered flight of increased diameter to a maximum point adjacent the inner surface of said barrel followed by a relatively deep portion cut to a minimum point at the root of the said screw; and
  a second transition section, the root of said extruder screw therein being gradually tapered to an increased diameter in the downstream direction;
  said device including at least one vent opening in the barrel adjacent said venting segments; and
  means enclosing said venting segments and said openings for carrying away vented volatile elements.

8. An extrusion device according to claim 7 wherein said enclosing means is a vacuum system.

9. An extrusion device according to claim 7 wherein the outside diameter of said extruder screw in each said venting segment is substantially the same.

10. An extrusion device according to claim 7 wherein a vent opening is formed in the barrel adjacent each said venting segment.

11. An extrusion device according to claim 7 wherein the taper of the flight and the depth of the cut in each said venting segment provide smearing of the extrudate across the entrance to the next venting segment and a constant velocity of extrudate travel through the vent section.

* * * * *

UNITED STATES PATENT OFFICE
CERTIFICATE OF CORRECTION

PO-1050 (5/69)

Patent No. 3,633,880     Dated January 11, 1972

Inventor(s) Larry J. Newmark

It is certified that error appears in the above-identified patent and that said Letters Patent are hereby corrected as shown below:

In the heading, line 2, delete "Guiderland" and insert -- Guilderland --; Column 2, line 74 after "each" insert -- said --; Column 3, line 5, after "wherein" insert -- a --; and line 19, after "of" delete "the".

Signed and sealed this 8th day of August 1972.

(SEAL)
Attest:

EDWARD M. FLETCHER, JR.          ROBERT GOTTSCHALK
Attesting Officer                Commissioner of Patents